J. E. CRAIG.
GUIDE AND GAGE FOR DENTAL DRILLS.
APPLICATION FILED NOV. 17, 1920.
1,366,877.
Patented Jan. 25, 1921.
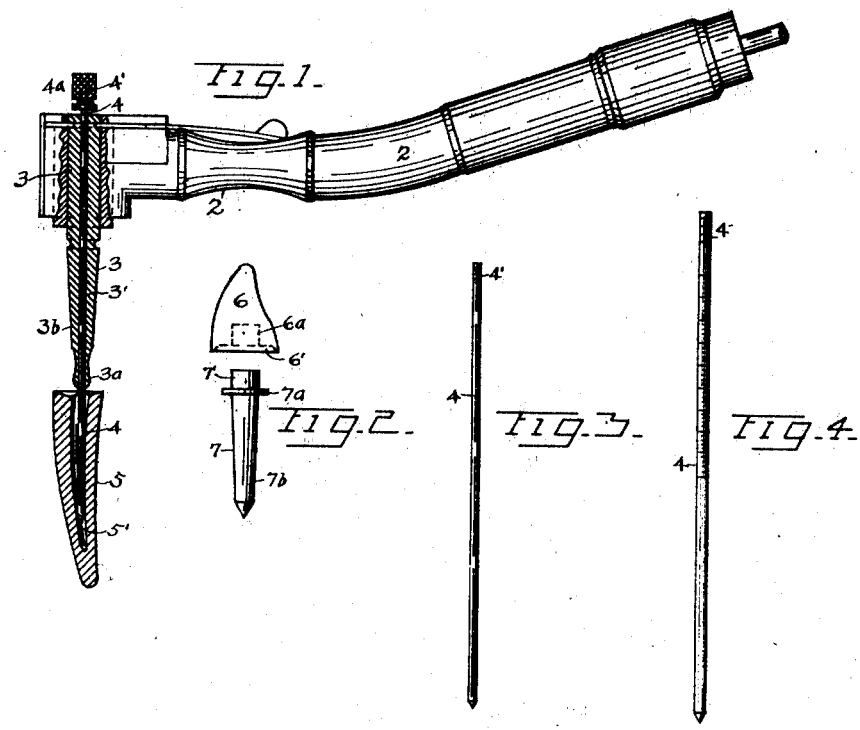
INVENTOR.
Joseph E. Craig.
BY Harry D. Wallace
ATTORNEY.

UNITED STATES PATENT OFFICE.

JOSEPH E. CRAIG, OF GARY, INDIANA.

GUIDE AND GAGE FOR DENTAL DRILLS.

1,366,877.

Specification of Letters Patent.   Patented Jan. 25, 1921.

Application filed November 17, 1920.   Serial No. 424,675.

*To all whom it may concern:*

Be it known that I, JOSEPH E. CRAIG, a citizen of the United States, residing at Gary, in the county of Lake and State of Indiana, have invented certain new and useful Improvements in Guides and Gages for Dental Drills, of which the following is a specification.

This invention relates to improvements in dental tools, and has for its object to provide novel, simple and effective means for readily and safely enlarging the root canals of teeth, so as to facilitate the crowning, as well as the filling of the teeth.

Heretofore, after the nerves have been killed and removed from the roots of the teeth, the dentists usually drilled, reamed, or otherwise enlarged the canals to receive the posts which support the crowns, and in doing this preliminary work, they invariably made use of the common solid burs or reamers. The posts employed for supporting the crowns are usually made to a standard length, and owing to the lack of any suitable means for gaging the depths of the canals, and for guiding the drills during the enlarging operations, the drills frequently cut through one or the other of the side walls of the roots, which invariably necessitated the extraction of the teeth. The more cautious dentists, in order to save the roots of the teeth from accidental perforation, drilled or reamed the canals for about one-half the required depth and then shortened the posts accordingly. This shortening of the posts naturally weakened the supports for the crowns and seriously affected the permanency of the work.

The present invention has for its particular object to provide a rod or pin of suitable diameter and length, which the dentist first inserts into the canal of a tooth to a depth corresponding substantially to the length of the post and leaves it there. A further object is to provide a drill or reamer, which is bored out in the line of its longitudinal axis to a diameter which operatively fits the gage rod. This hollow drill or reamer, after being connected to a suitable operating means, is next slipped over the exposed end of the gage rod. The boring or reaming of the canal is then started, and during the whole of the enlarging operation, the boring tool follows and is guided by the said rod, with the result that the enlargement is effected substantially in the line of the axis of the canal or root, and therefore perforation of the root is avoided.

I attain these objects by the means set forth in the detailed description which follows, and as illustrated by the accompanying drawing, in which—

Figure 1 is a view of the hand-piece of a dental engine, to which the hollow drill is applied ready for reaming out the canal of a tooth from which the nerve has been removed; also showing the guide and gage rod inserted in the canal of the tooth for guiding the drill, as well as for gaging the depth of the enlargement of the canal. Fig. 2 is respectively an elevational view of a crown, and the post which supports the crown. Fig. 3 is a view of the gage and guide rod with the thumb-nut attached. And Fig. 4 is an enlarged view of the rod; showing the top-end threaded to receive the nut; also showing graduations below the threads for indicating the extent of the drilling or reaming.

In the drawing, 2 is what is commonly designated the hand-piece of a dental engine, which is arranged to receive and drive drills, burs, reamers and other similar tools. 3 represents one of the boring tools which is bored out in the line of its longitudinal axis, as at 3'. 4 represents a rod, preferably made of steel, which has a diameter corresponding to that of the bore 3' of the drill. The top-end 4' of the rod may be threaded to receive a thumb-nut 4ª which serves mainly as a handle, and which is removable for facilitating the telescoping of the rod and the drill. Below the threaded portion, the rod 4 is preferably graduated in any suitable manner for indicating linear measurements. 5 represents a tooth, from which the nerve has been removed, leaving a clear longitudinally extending canal 5'. The canal 5' is common to the roots of all teeth, and is usually curved or tortuous corresponding to the general shape of the root. The top-end of the tooth 5 is shown ground or dressed in readiness for the mounting of a crown, as 6, the latter being provided in its bottom face with a concavity 6', which receives the top-end of the tooth 5, and a normally central socket 6ª for receiving a corresponding portion 7' of a metallic post 7, which projects above an annular flange 7ª. The main body 7ᵇ of the post is somewhat elongated and tapering, as best seen in Fig. 2, for convenient and rigid application to the tooth 5 after the canal 5' has been suitably enlarged by the operation of the hollow tool 3. The tip 3ª of the drill preferably comprises the usual bur which effects the principal part of the boring or cutting, while the body 3ᵇ comprises a tapering reamer for accomplishing part of said work. After the tooth 5 is prepared, as shown in Fig. 1, the dentist takes the rod 4, unscrews the thumb-nut 4ª and then inserts the opposite end of the rod into the canal 5' as far as it will go (see Fig. 1) and leaves it there. He next secures the drill 3 in the hand-piece 2, and slips the drill over the threaded end of the rod 4, after which he replaces the nut 4ª. When the foregoing steps are completed, he starts the engine (not shown) and drills and reams the canal 5' until the latter is enlarged sufficiently to receive the post 7. As the boring and reaming work progresses, the operator may consult the calibrated portion of the rod 4, which accurately indicates the depth of the enlargement. During all of the drilling and reaming operation, the drill 3 follows and is suitably guided by the rod 4, and by this means, the enlargement of the canal 5' may be readily and safely effected, and without danger of the bur cutting through and perforating the adjacent walls of the canal. By the provision and use of the rod 4 and the hollow drill 3, all crowning, as well as the larger filling work, may be properly and accurately accomplished, and this work may be more readily and quickly effected, than by any of the old methods of performing the said work known to me.

Having thus described my invention, what I claim as new and desire to secure by Letters Patent, is—

1. In means for enlarging the root canals of teeth, the combination of a hollow drill, and a calibrated rod which operatively fits the bore of the drill, the said rod adapted to be inserted partway into the canal of a tooth in advance of the enlarging operation, and the said drill adapted to be telescopically applied to the calibrated portion of the rod which projects beyond the tooth and to be guided by said rod throughout the enlarging operation.

2. In means for enlarging the canals of teeth, the combination with a longitudinally perforated drill, of a rod having a diameter corresponding to the bore of the drill and a length greater than said drill, one end of said rod being threaded, and the portion of said rod adjacent the threads being graduated for indicating linear measurements, the plain end of said rod adapted to be inserted into the canal of a tooth in advance of the enlarging operation, and the said drill adapted to be slipped over the exposed end of the rod and to follow and be guided by said rod along the longitudinal axis of the canal during the enlarging thereof.

3. In means for enlarging the canals of teeth, the combination of a boring tool bored out in the line of its longitudinal axis, and a guide rod of greater length than said tool and having a diameter corresponding substantially to the bore of said tool, the said rod adapted to be inserted partway into the canal of a tooth and held stationary therein by frictional contact with the inner walls of the canal, the said tool adapted to be telescopically applied to the exposed end of said rod and to be rotated for boring out and enlarging the canal, the said tool during the boring and enlarging of the canal being guided by said rod substantially along the longitudinal axis of the root of the tooth for preventing the perforation of said root laterally.

In testimony whereof I affix my signature.

JOSEPH E. CRAIG.